United States Patent [19]
Schutze

[11] 3,877,246
[45] Apr. 15, 1975

[54] AIR-CONDITIONING FOR AIRCRAFT CABINS

[75] Inventor: Horst Schutze, Leeste, Germany

[73] Assignee: Vereinigte Flugtechnische Werke-Fokker GmbH, Bremen, Germany

[22] Filed: July 15, 1974

[21] Appl. No.: 488,517

[30] Foreign Application Priority Data
July 18, 1973 Germany.............................. 2336500

[52] U.S. Cl. .......................... 62/402; 62/86; 62/243
[51] Int. Cl. .............................................. F25d 9/00
[58] Field of Search ................... 62/402, 172, 87, 88

[56] References Cited
UNITED STATES PATENTS

| | | | |
|---|---|---|---|
| 2,557,099 | 6/1951 | Green | 62/402 |
| 2,734,443 | 2/1956 | Wood | 62/172 |
| 2,800,002 | 7/1957 | Seed | 62/402 |
| 3,177,676 | 4/1965 | Abrahams | 62/402 |
| 3,177,679 | 4/1965 | Quick | 62/172 |
| 3,369,777 | 2/1968 | Furlong | 62/402 |

FOREIGN PATENTS OR APPLICATIONS

| | | | |
|---|---|---|---|
| 687,482 | 5/1964 | Canada | 62/402 |

Primary Examiner—William J. Wye
Attorney, Agent, or Firm—Ralf H. Siegemund

[57] ABSTRACT

An air conditioning system uses available compressed air (e.g., from an engine compressor) and feeds it into a cascade of two decompression compressors, a heat exchanger and a moisture precipitator which discharges into the cabin. Air is bled off the cabin to maintain a particular pressure, but a return flow for air from the cabin is also maintained, such air being cleaned and compressed, chilled and mixed with the tapped air. The mixing stage is provided upstream of the second turbine but downstream of the first one. The compressed return flow air is either cooled before mixing in a separate cooling circuit, or is added to the tapped air flow upstream of the heat exchanger. Turbines and heat exchanger are bypassed individually or jointly for temperature control. One or both turbines drive the compressor for the return flow of air, both turbines or the other one drive normally a blower for drawing air through the heat exchanger as recipient for thermal energy.

21 Claims, 4 Drawing Figures

AIR-CONDITIONING FOR AIRCRAFT CABINS

BACKGROUND OF THE INVENTION

The present invention relates to climate control and air conditioning of aircraft cabins particularly under circulation of initially pressurized but subsequently decompressed air.

Present day aircraft are usually air conditioned by tapping air from an engine compressor or from another onboard compressor, and decompressing permits control of the pressurization of the air in the cabin. However, tapping air from an engine invariably reduces the power output thereof. Therefore, the power consumption and amount of tapped air should be kept at a minimum.

The British Pat. No. 976,564 discloses a climate control and air conditioning system for aircraft cabins using circulation of pressurized air. Particularly, an air driven turbine drives a compressor but is affected significantly by any pressure changes in the engines; that in turn varies the amount of circulated air. In the case of low engine pressure the amount of circulated air may even drop to zero. In some instances, i.e., when the craft is on the ground one needs additional means here for moving a coolant.

DESCRIPTION OF THE INVENTION

It is an object of the present invention to provide for a system for climitizing and air conditioning the cabin of an aircraft in which the tapping or other derivation of compressed air is minimized so that the operation of the device for whose benefit the compressed air is developed is not interfered with by tapping undue amounts of such compressed air.

It is another object of the present invention to provide for a system for climate control of aircraft cabin which operates rather independently from variations in pressure of the source from which the conditioned air is being derived.

In accordance with the preferred embodiment of the invention it is suggested to provide a conditioning path for pressurized air which includes a series connection under utilization of suitable conduit means of two turbines for cascaded decompression of air; a heat exchanger means for chilling the pressurized air through heat exchange with air drawn from the environment; and a mixing stage for mixing that air with clean and compressed air in a return path and drawn from the aircraft cabin. The series connection feeds to a moisture precipitator which in turn discharges into the aircraft cabin. A bleeder valve maintains the cabin pressure at a desired value. One or both of the turbines drive the compressor in the return path, and a blower for drawing encironmental air through the heat exchanger may also be driven by both turbines or by the respective other one.

Considering the invention from a different point of view it can also be said that an air circulation is to be established through the cabin, and including an air cleaner, a compressor, a heat exchanger, a decompression turbine driving also the compressor and a precipitator for removing moisture before returning the air to the cabin. Additional air is added to the return flow air, drawn from an available compressor and decompressed in another turbine before being introduced into the circulation above and subjected to chilling by heat exchange either before or after mixing. Excess air is discharged from the cabin through a control valve. Since as much air as possible is to be returned and circulated, tapping of the engine compressor is needed only to a relatively small extent and merely to augment the amount of air which is being discharged.

The air, or most of the air that is being fed into the cabin should pass through the heat exchanger for chilling. One can use here a single heat exchanger and place the mixing stage ahead thereof so that the mixed air is subjected to cooling in the heat exchanger. Alternatively, one uses two or a two circuit heat exchanger for separately chilling the air from the source and the return flow air, before mixing them. The system offers a variety of possibilities for bypass control to obtain temperature control in a manner which does not require either turbine or the heat exchanger to be operated under controlled conditions for that purpose.

The first decompression turbine should be placed ahead of the mixing point, so that compression in the return path and decompression in the first turbine establishes about similar pressure levels of the air to be mixed. On the other hand, the second turbine will receive always the mixed air so that pressure variations in the primary source of pressurized air are more readily compensated. Driving the blower by means of one of the turbines permits cooling of the air particularly when the craft is still on the ground. On the other hand, the blower may be bypassed if dynamic pressure is used during flight to sustain a flow of heat-receiving air through the heat exchanger.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows an aircraft engine 1 to which is connected a tap line 2 for feeding air from the engine compressor to the air circulation system 7. The engine has a fan 1a in front, a median pressure compressor 1b and a high-pressure compressor 1c. The tap line 2 is connected particularly to the high-pressure compressor 1c.

Figure 1:
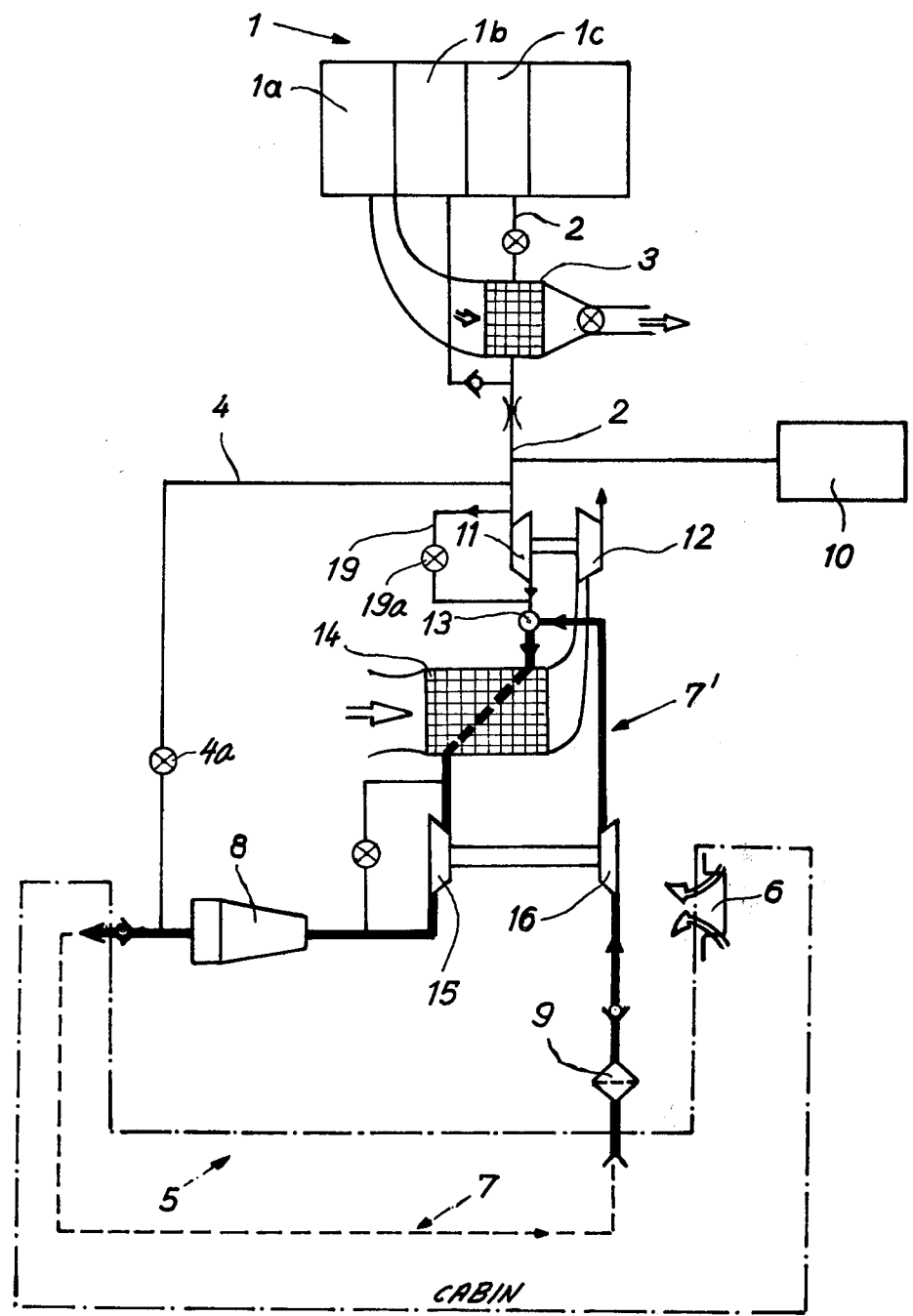
FIGS. 1, 2, 3 and 4 each are block and flow diagrams of examples of the preferred embodiment of the invention.

The tapped air is first fed to a first stage cooling device 3 in which tapped air gives off heat to cooler air taken from the fan and passing also through heat exchanging device 3. The flow out of heat exchanger 3 constitutes the source of pressurized air to be used in all of the embodiments with the understanding that such precooling is not essential in principal for practicing the invention. Source pressure may also be derived from an auxiliary gas turbine 10 provided normally for driving of auxiliary equipment such as generator, fuel pump etc. and which is also used for starting the engine. Thus, the gas turbine 10 will run before the engine is started, so that the compressor of that gas turbine is an available source for pressure. Since the compressed air is not as hot as air taken from the high pressure compressor stage of the engine precooling is not necessary in that case.

The pressurized, tapped air possibly after having been cooled in 3 flows to the high pressure input side of a first turbine 11 in which the tapped air is decompressed and cooled, thereby performing work, in that the turbine 11 drives a blower or fan 12.

If the air in tap line 2 has rather low pressure, the tapped air may pass through a bypass 19 in that valve 19a is being opened, thus bypassing turbine 11. Tapped air leaving the turbine at its lower pressure side, or having passed through the bypass, is at a low pressure level and is mixed in a stage 13 with air which has circulated through the cabin and has been drawn therefrom.

The resulting mixture passes through a second heat exchanger 14 in which the heat content of the mixture of return air and of the tapped air is reduced. Air just drawn from the environment serves as recipient for that heat. The blower 12 draws relatively cool air from the environment for passage through heat exchanger 14.

The output side for primary flow of heat exchanger 14 is connected to the high pressure input side of another turbine 15 so that the chilled air be decompressed and cooled further. Turbine 15 drives a compressor 16 which compresses circulating return flow air before being fed to mixing point 13 to be combined with the tapped air. The low pressure output side of turbine 15 is connected to a precipitator and water collector 8 for collecting moisture which has precipitated as a result of cooling air in the various stages.

Turbine 15 is also provided with a valve controlled bypass to feed air directly from heat exchanger 14 to precipitator 8. This bypass may be provided specifically for temperature control so that the operation of the turbine as such is not subject to air temperature control.

The air as leaving precipitator 8 is passed into the aircraft cabin 5. However, for purposes of temperature control one may mix the decompressed, cold air from precipitator 8 with warmer, pressurized air from line 2 via bypass 4, being under control of a valve 4a to obtain the desired temperature conditions in the cabin. Some pressure regulation may also be provided at that point.

The dash dot line delineates schematically the aircraft cabin 5 and reference numeral 7 refers to the air circulation through the cabin. A pressure controlling valve 6 discharges some of the cabin air so that particular pressure is maintained in the cabin. The degree of discharge can be used as additional or primary pressure regulation for the cabin pressure.

As indicated schematically, the bleeder valve 6 should be located in a rather remote location so that as much air as possible is returned through a return flow path 7'. Air not discharged through valve 6 is drawn out of the cabin and passes through a filter 9 to remove $CO_2$, fumes, smoke etc. and the cleaned return flow air passes a check valve and into the compressor 16 to be pressurized before being added to tapped air at point 13. The pressure conditions should be adjusted such that the tapped air flow as added to the return flow is kept at a minimum, so that complete renewal of air will occur only to the extent necessary to avoid overloading the cleaning device 9.

It can thus be seen, that this particular example realizes a series connection of, in that order, a first decompressing turbine 11 driving the blower, a mixing or flow combining stage 13 adding return flow air from compressor 16; a heat exchanger for cooling the mixture; a second decompressing turbine driving compressor 16 and a precipitator. The cabin and the cleaner complete the circulation and valve 6 discharges excess air. However one can also say that a circulation through the cabin 5 is maintained via cleaner 9, compressor 16, heat exchanger 14, decompression turbine 15 and precipitator 8. With air being added from a source line 2 after preliminary decompression in turbine 11 but ahead of heat exchange in 14.

The system as described does not depend on tapping of air from either one of the engines but the intake at line 2 may be provided by a separate compressor. Still alternatively one may connect the compressor of the auxiliary gas turbine 10 to tap line 2 as already stated above.

Figure 2:
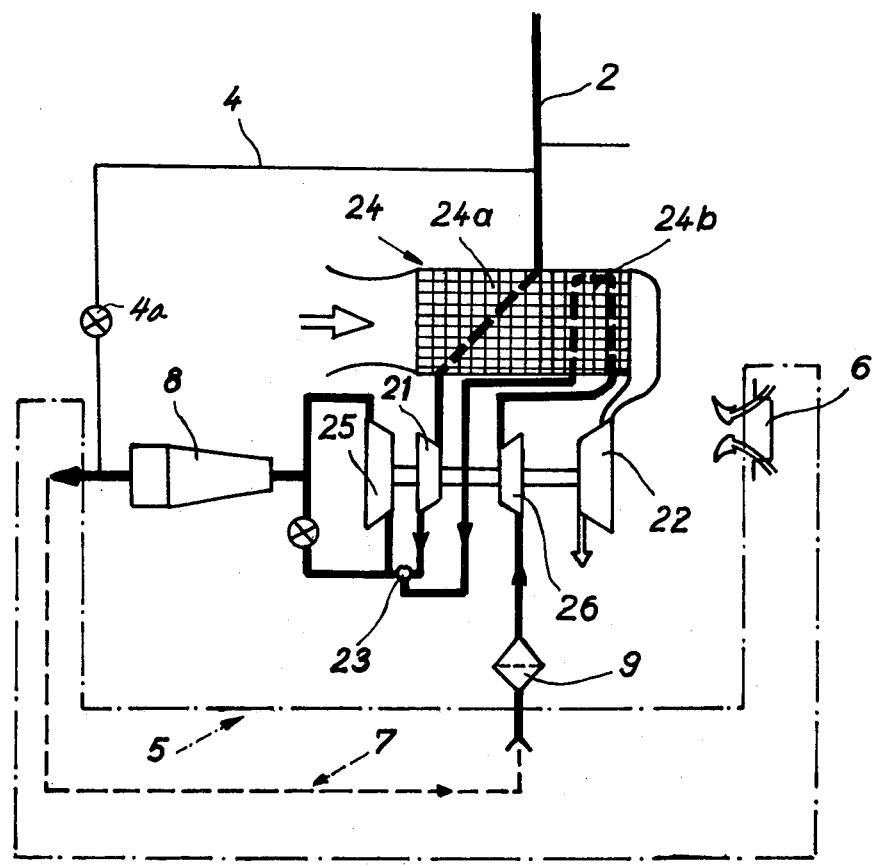
Figure 3:
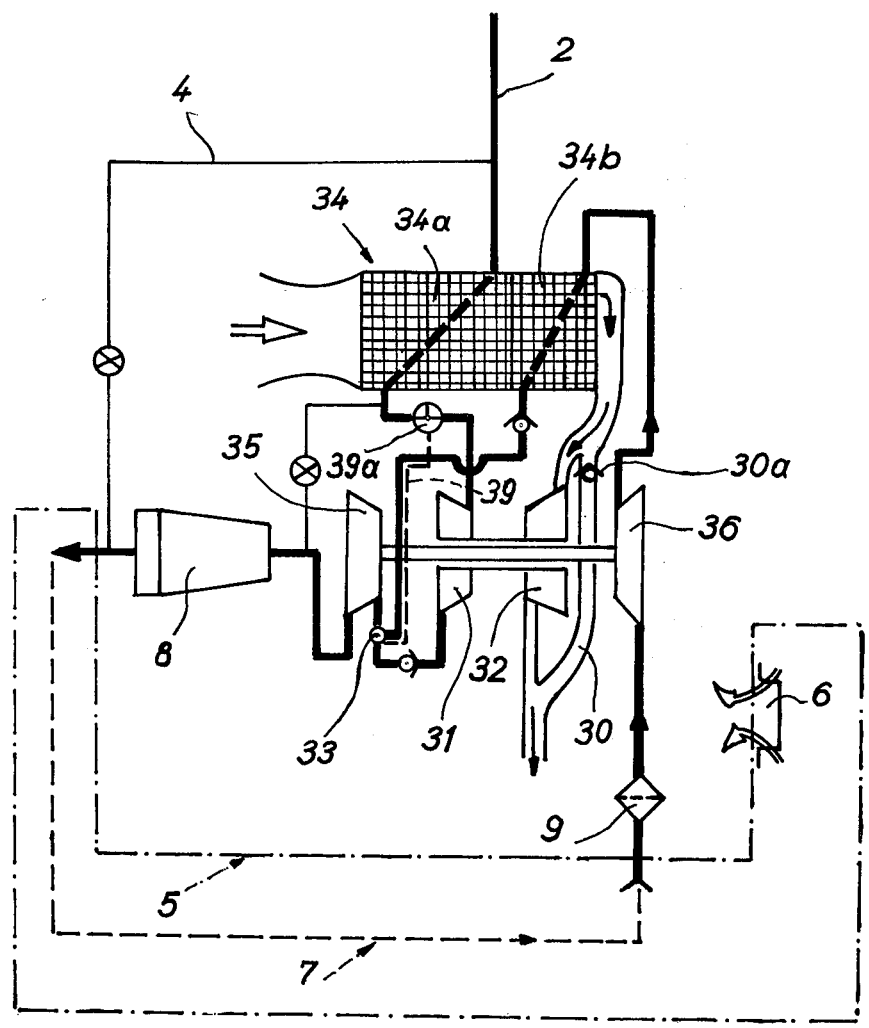
Figure 4:
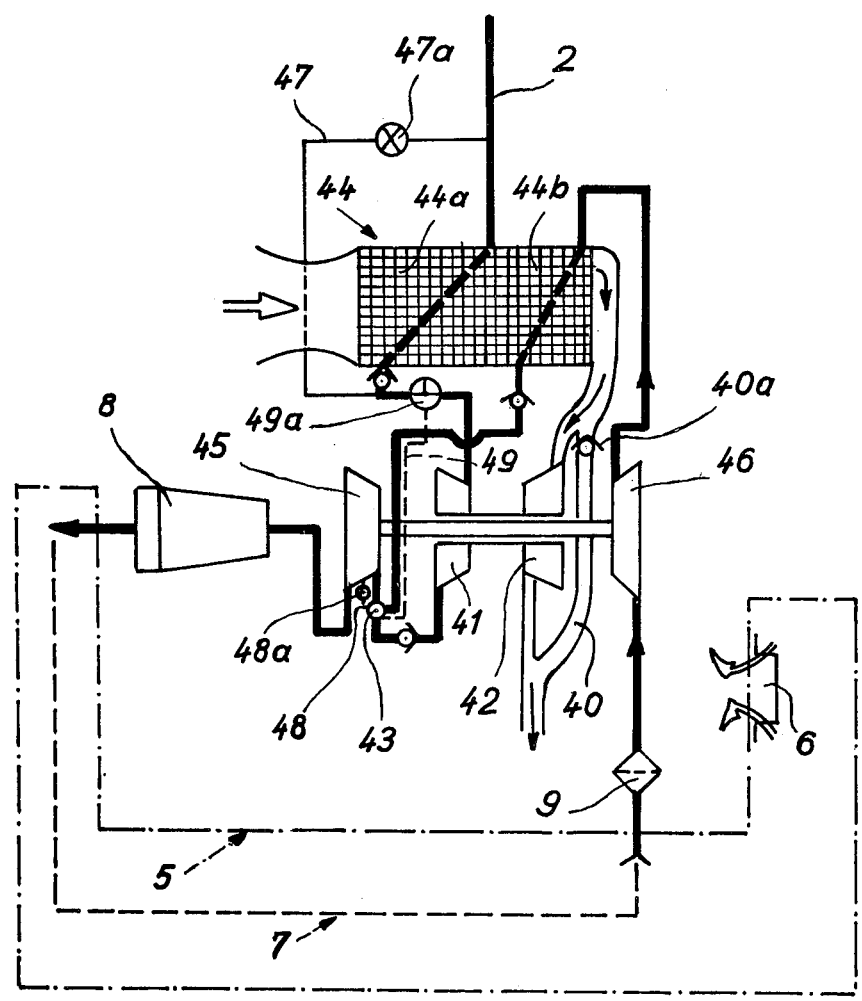

Proceeding now to FIGS. 2, 3, and 4, the examples of the preferred embodiment of the invention all show two separate heat exchange circuits, one from the tapped air and a second one for the return flow air as compressed after leaving. Moreover, the mixing stage is connected between the two decompression turbines. Turning now to details particularly in FIG. 2, reference numeral 2 refers also here to a tap line which leads to the main engine compressor and/or the compressor of a gas turbine. The air may also have passed already through a precooling stage equivalent to 3 in FIG. 1.

The particular system in FIG. 2 has again two cooling turbines, denoted here 21 and 25, and a compressor 26 for the return flow as well as a blower 22, and all these four elements are mounted on a common shaft, or are otherwise drivingly interconnected. A heat exchanger 24 is also provided here but constructed for two separate primary circulations or circuits 24a, 24b with a common secondary flow path for coolant which is air drawn by operation of blower 22.

Air entering the system on tap line 2 (and after having passed the precooling stage) passes first through the first heat exchange circuit 24a and is cooled therein and decompressed only subsequently in the first turbine 21. The decompressed air from turbine 21 is now fed to mixing stage 23 wherein it is mixed with air that has passed through the second heat exchange circuit, 24b, of heat exchanger 24.

The resulting mixture of partially decompressed tapped air and of compressed return flow air is decompressed further to almost cabin pressure level in turbine 25, and the low pressure output side of that turbine is also connected to precipitator 8 for removal of moisture, possibly mixed with warm pressurized air for temperature control (bypass 4) before being fed to cabin 5.

Also as before, some air is bled off the cabin 5 through valve 6 to maintain cabin pressure at a desired value, and the remainder of air is returned to the system through filter 9 for cleaning and compressed in compressor 26. The pressurized output of the compressor 26 feeds the second heat exchange circulation 24b, and the chilled return flow air is added to the tapped air at mixing point 23.

This particular system is somewhat more compact and lighter because of the driving interconnection of the two turbines, the blower and compressor 26. Moreover, the two circuit heat exchangers are a more economical and more efficient arrangement.

FIG. 3 shows a modification of the system of FIG. 2 but maintaining the two heat exchanging circuit principle. The first and second decompressing turbines are denoted here with reference numerals 31 and 35 respectively; the heat exchanger and its circuits are identified by 34, 34a and 34b.

The first stage turbine 31 drives blower 32 drawing air through heat exchanger 34 for receiving thermal energy from the two primary circuits 34a, 34b. The blower 32 is coupled to the turbine 31 through a hollow shaft. The blower 32, however, provides coolant flow only on the ground. During flight a check valve 30a opens a bypass 30, so that blower 32 is no longer effective. Instead, dynamic pressure is used for sustaining air flow from the environment into heat exchanger 34, and the bypass 30 simply provides for discharge of that air from the heat exchanger.

The second stage turbine 35 drives the compressor 36 as processing the cleaned return flow air drawn from the cabin, and the return flow air as compressed is fed to one input of mixing stage 33, after having passed through heat exchange circuit 34b. The other input to mixing stage 33 is the decompressed output of turbine 31. However, a bypass 39 is provided, bypassing turbine 31 and feeding tapped air into mixing stage 33 as third or as an alternative input for tapped air. A check valve in the low pressure output circuit of turbine 31 blocks that path if bypass 39 is effective. The bypass 39 is under control of a valve 39a and the position of valve 39a determines whether air is fed to mixing stage 33 from heat exchange circuit 34a either directly or through the turbine 31.

Valve 39a will switch to the bypass if the craft is at a high altitude or if the main engine runs idly so that the available tapped air is at a relatively low pressure. If valve 39a opens the bypass, all necessary decompression is carried by the second stage turbine 35. Very little additional work is performed by turbine 35 under such circumstances.

It can thus be seen that the example of FIG. 3 is basically similar to FIG. 2 except that two bypass circuits modify operation of the airconditioning system for different altitudes.

FIG. 4 is a modification of the system as shown in FIG. 3. Therefore, this particular system includes a two circuit heat exchanger 44 whose first circuit 44a feeds first stage decompressing turbine 41 which drives blower 42 through a hollow shaft. The second circuit 44b links clean return air compressor 46 with mixing stage 43 having second and third alternative inputs respectively from valve controlled bypass 49 and turbine 41. Turbine 41 drives blower 42, but a bypass 40 with valve permits also here utilization of ram pressure at high altitudes for causing low temperature air to receive heat from the two circuits 44a, 44b. The mixing stage 43 feeds second stage decompressing turbine 45 which in turn feeds the precipitator 8. Thus far, the system is similar to the one shown in FIG. 3.

The system of FIG. 4 differs from the system of FIG. 3 (and FIG. 2) in that bypass 4 is replaced by a bypass 47, merely bypassing the first circuit 44a of heat exchanger 44. A valve 47a opens and closes this particular bypass. This way one obtains a temperature control for the air as it enters the or one of the turbines 41, 45 to obtain temperature control for cabin temperature at an early stage. This deviation from FIG. 3 has the advantage, that still all of the tapped air plus all of the return flow air will pass through turbine 45 irrespective of the state of bypasses 47 and 49. Therefor, temperature control through bypass control will not influence the driving power of turbine 45 as it drives the compressor 46.

A second modification over the system shown in FIG. 3 is to be seen in the provision of an additional air feeding nozzle for turbine 45 to which air is fed via branch line 48 as controlled by a valve 48a. This way, one enlarges the effective cross-section for air inflow into turbine 45 which is important if the working pressure is quite low as taken from the engine compressor. The air throughput of turbine 45 can be increased in this manner and can be made more readily to meet minimum throughput requirements for the turbine.

It can thus be seen that all of the examples as illustrated in FIGS. 1 through 4 realize the inventive concept in a rather advantageous manner. In particular, the compressor for return flow air operates at substantially constant power, because the turbine (15 or 25 or 35 or 45) driving this compressor is basically passed through and driven by the combined flows of tapped and return air, and even the temperature controlling bypass can be placed (FIG. 4) so that return from the bypass occurs at some point on the high pressure side of this second stage decompressing turbine. As a consequence, variations in tapped air pressure do not propagate into this second stage turbine and will not or hardly influence the conditioning of the air as fed into the cabin.

The invention is not limited to the embodiments described above but all changes and modifications thereof not constituting departures from the spirit and scope of the invention are intended to be included.

I claim:

1. A system for climate control, heating and air conditioning of an aircraft cabin, comprising:
   first means for providing pressurized air;
   a first decompressing turbine having a high pressure input side and a low pressure output side;
   heat exchange means including first flow path defining means for passage of air to be cooled and second flow path defining means for passage of a coolant;
   a second decompressing turbine, also having a high pressure input side and a low pressure output side;
   flow conduction means for connecting the first and second turbines and the said first flow path of the heat exchange means in series and to the first means in such a manner that the second turbine is connected downstream from the first turbine as well as from the heat exchange means;
   a precipitator for removing precipitated moisture and connected to receive decompressed air from the output of the second turbine, air flowing from the precipitator into the aircraft cabin;
   second means including cleaning filter means for drawing air from the cabin;
   a compressor driven by one of the turbines and connected to the second means for compressing cleaned air as drawn from the cabin;
   a mixing stage included in the conduit means and connected for receiving the air as compressed by the compressor; and
   a bleeder valve for maintaining a particular pressure in the cabin, so that not all of the air entering the cabin from the precipitator is returned through the filter.

2. A system as in claim 1, wherein a blower is provided, being driven by one of the turbines and drawing air as coolant through the said second flow path of the heat exchanger means.

3. A system as in claim 2, wherein the compressor is driven by the second turbine, the blower being driven by the first turbine.

4. A system as in claim 3, wherein the blower and the compressor are driven by the respective turbine via concentric shafts.

5. A system as in claim 2, wherein both turbines drive the compressor and the blower.

6. A system as in claim 2, including a controlled bypass for the blower operative when the coolant is provided as air entering the heat exchanger under dynamic pressure.

7. A system as in claim 1, the air as compressed by the compressor being also passed through the heat exchanging means.

8. A system as in claim 7, the mixing stage being connected ahead of the heat exchange means so that the exchange means chills the combined air as provided by the first means and as mixed with the air as compressed by the compressor.

9. A system as in claim 8, first turbine connected so that the mixing stage receives air from the first means as decompressed in the first turbine.

10. A system as in claim 7, the heat exchange means having two separate circuits as first flow path, the air from the first means passing through one of the circuits, the air from the compressor passing through the other one of the circuits.

11. A system as in claim 10, the first and second turbines connected serially to the output side of the one circuit of the heat exchange means the mixed stage connected between the first and second turbines, receiving the compressed air from the output side of the other heat exchange circuit.

12. A system as in claim 1, the first flow path of the heat exchange means being connected between the low pressure output side of the first turbine and the high pressure input side of the second turbine, the mixing stage connected upstream and to the input side of the first flow path of the heat exchange means so that the mixed air passed through the heat exchange means.

13. A system as in claim 12, including a valve controlled bypass for at least one of the turbines.

14. A system as in claim 1, the mixing stage connected so that the mixed air passes through the second turbine.

15. A system as in claim 1, the heat exchange means having first and second circuits as first flow path, the first circuit connected to the input of the first turbine, the mixing stage connected between the output of the first turbine and the input of the second turbine, the output of the compressor being connected via the second circuit to the mixing stage, so that compressed and cleaned air as drawn from the cabin is mixed with air as decompressed in the first turbine, the air as mixed being decompressed in the second turbine.

16. A system as in claim 15 and including a controlled bypass around the second turbine.

17. A system as in claim 15, including a valve controlled bypass around the first circuit of the heat exchange means for temperature control of the air from the first means before being fed to the mixing stage.

18. A system as in claim 15 and including a valve controlled bypass connection as between the output side of the first circuit of the heat exchange means and the output of the first turbine, bypassing the same.

19. A system as in claim 18, and including a blower driven by the first turbine to draw air through the second flow path of the heat exchange means, further including a bypass for the blower to be effective when flow through the second flow path is sustained dynamically through ram pressure.

20. A system as in claim 15 and including an additional inlet nozzle for the second turbine for increasing the effective cross-section of air flow into the second turbine, the nozzle bypassing the input side of the second turbine but connected downstream from the output side of the mixing stage.

21. A system as in claim 1 and including a valve controlled bypass around the first and second turbines.

* * * * *